Patented July 25, 1944

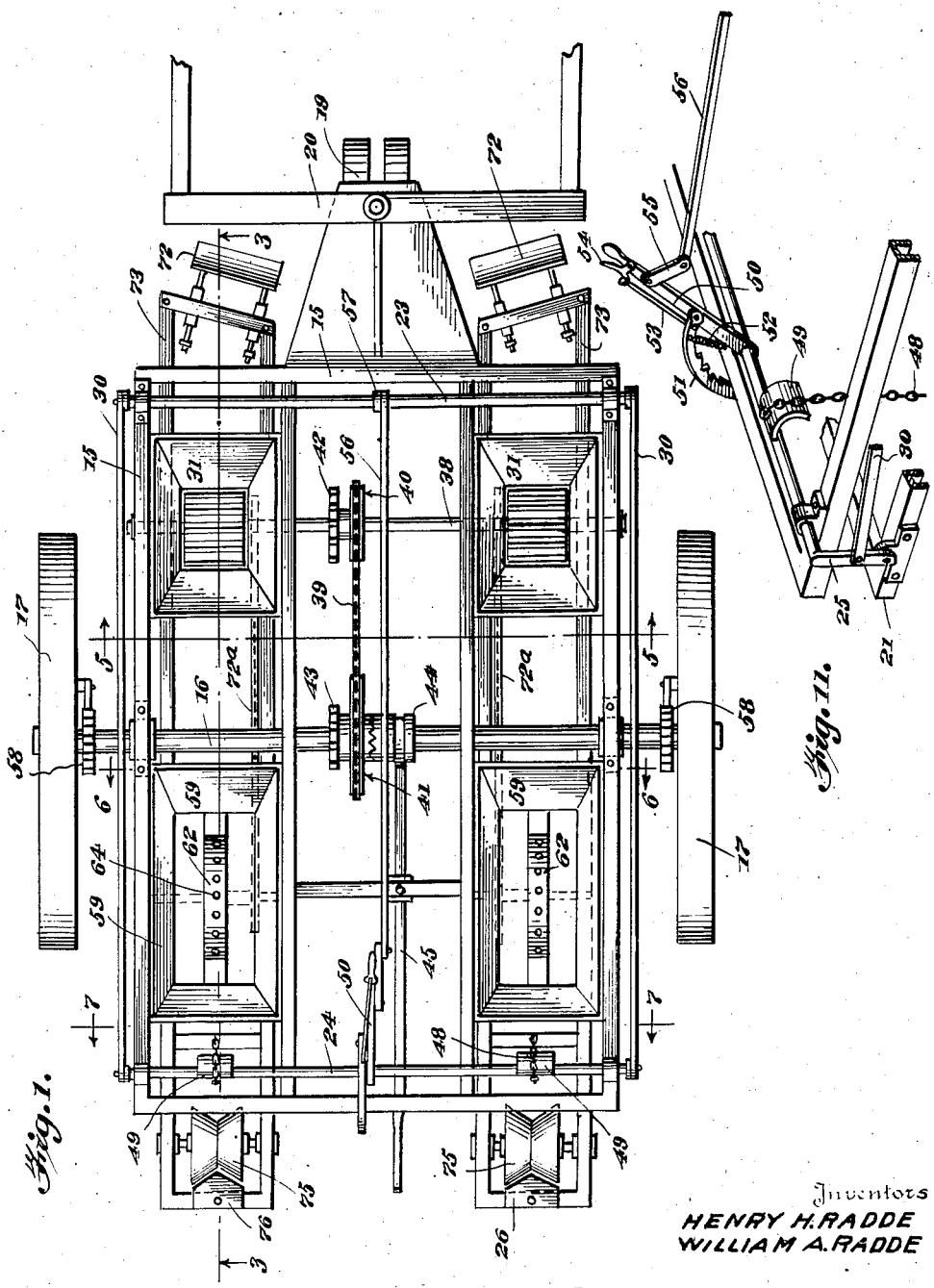

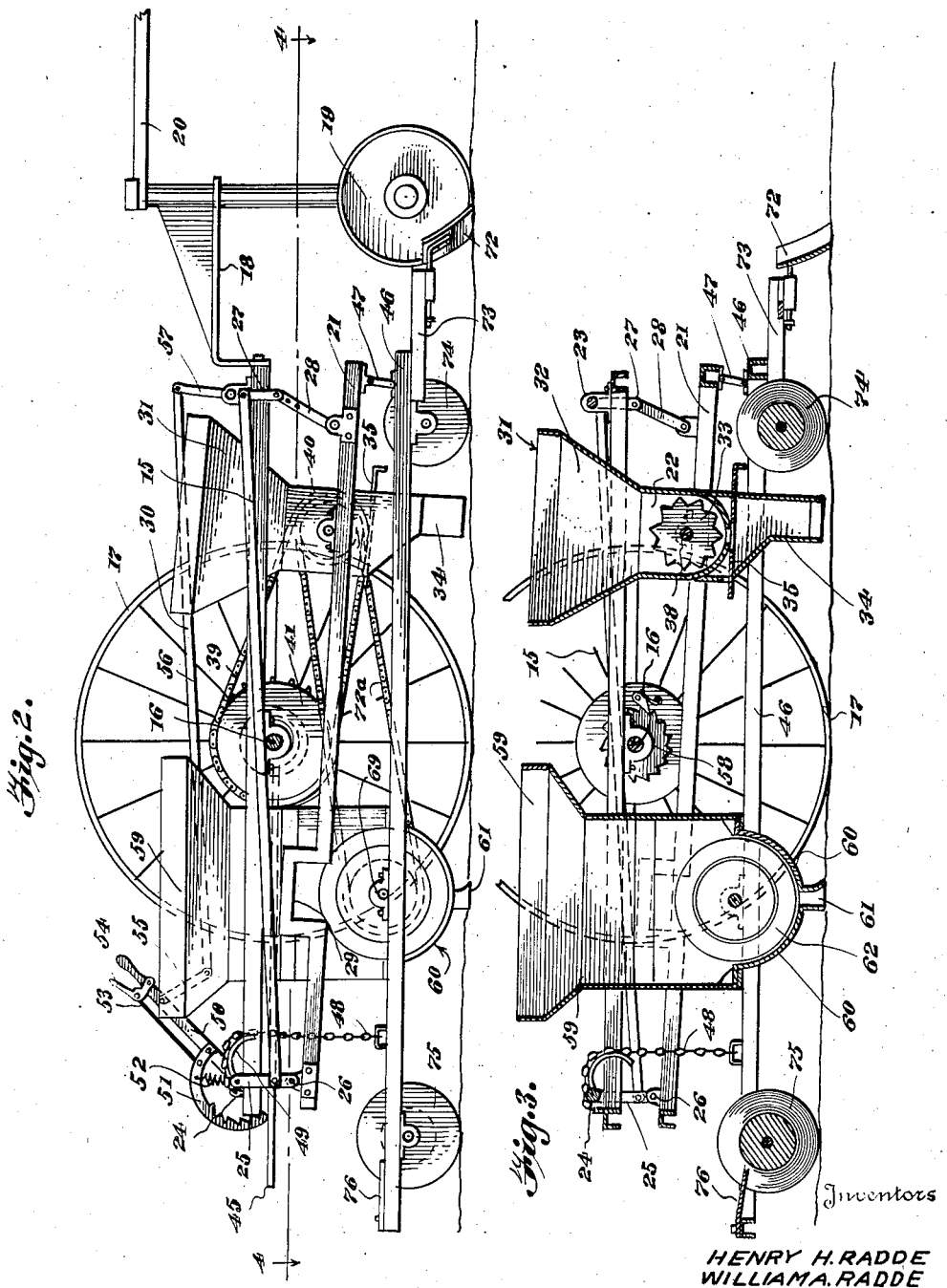

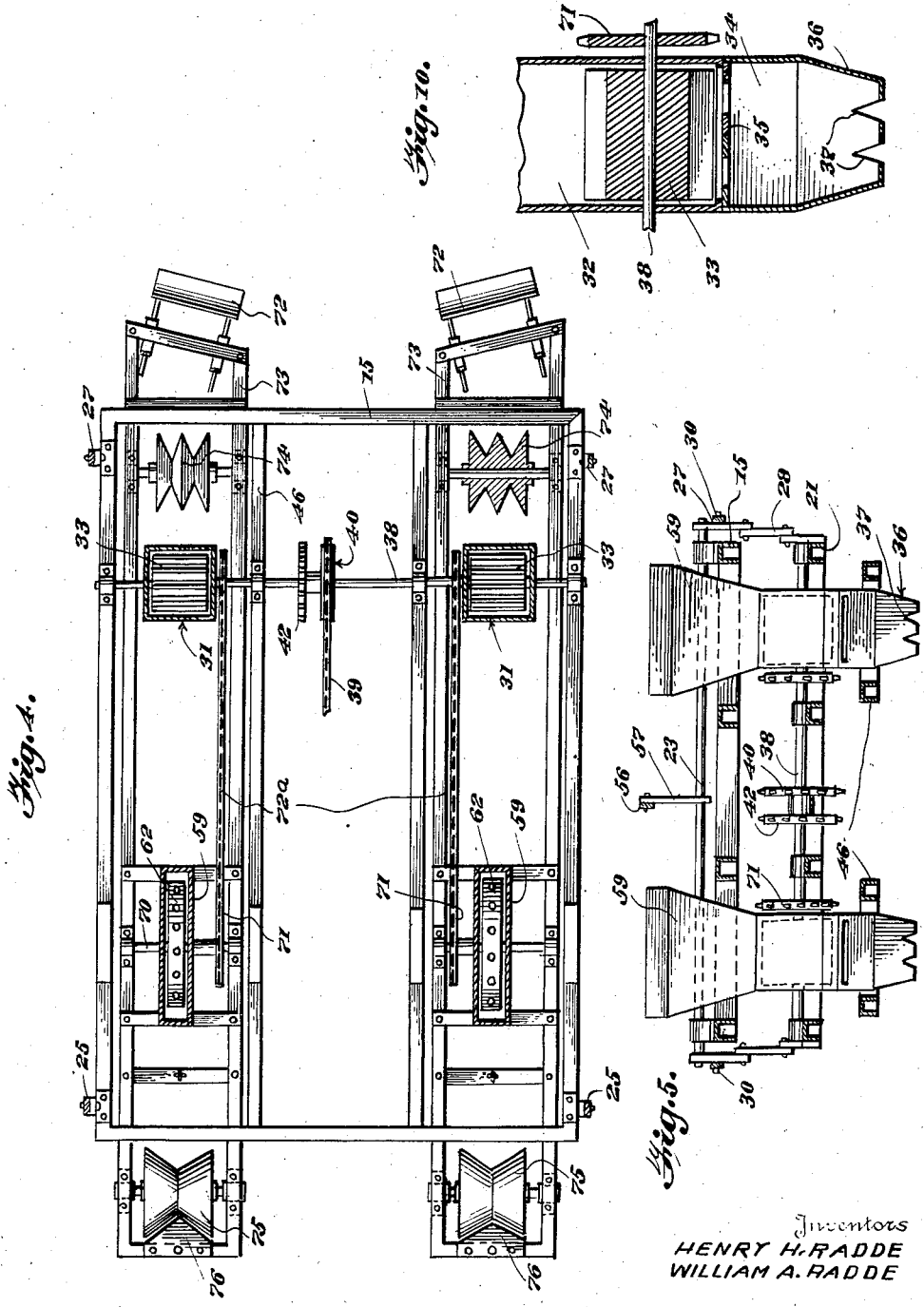

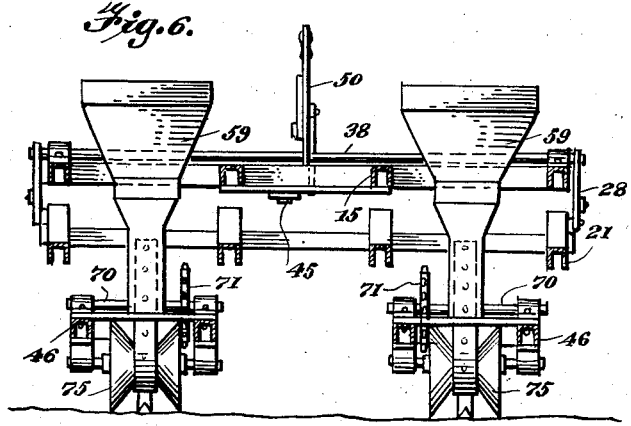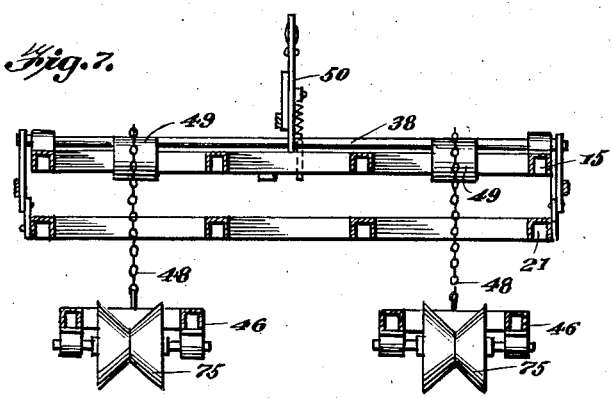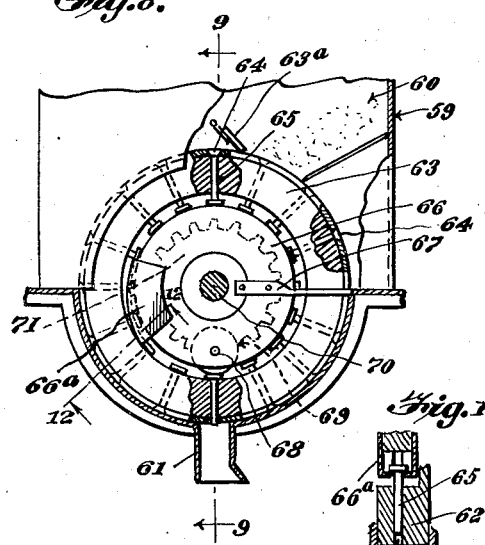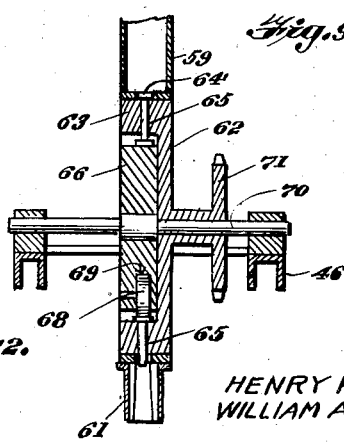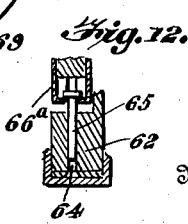

2,354,541

UNITED STATES PATENT OFFICE 2,354,541

SUGAR BEET SEED DRILL AND FERTILIZER ATTACHMENT

Henry H. Radde and William A. Radde, Bay City, Mich.

Application August 13, 1941, Serial No. 406,678

4 Claims. (Cl. 111—59)

This invention relates to a seed drill and fertilizer attachment which is especially designed for planting sugar beet seed, but which may also be used for planting other seed such as corn, peas, beans, and the like.

One of the principal objects of this invention is the production of a simple and efficient means for dropping single seeds in any given distance of rows or hills, and for spreading fertilizer in any given amount.

A further object of this invention is the production of a fertilizer attachment which will deposit fertilizer to the sides of and under the seed which is being planted.

Other objects and advantages of the present invention will appear throughout the following specification and claims.

In the drawings:

Figure 1 is a top plan view of the seed drill and fertilizer attachment;

Figure 2 is a side elevational view;

Figure 3 is a longitudinal sectional view taken on line 3—3 of Figure 1;

Figure 4 is a horizontal sectional view taken on line 4—4 of Figure 2;

Figure 5 is a transverse sectional view taken on line 5—5 of Figure 1;

Figure 6 is a transverse sectional view taken on line 6—6 of Figure 1;

Figure 7 is a transverse sectional view taken on line 7—7 of Figure 1;

Figure 8 is an enlarged vertical sectional view through the seed distributing hopper;

Figure 9 is a vertical sectional view taken on line 9—9 of Figure 8;

Figure 10 is a fragmentary vertical sectional view taken through the lower end of the fertilizer distributing hopper;

Figure 11 is a fragmentary perspective view of a portion of the frame of the machine illustrating the lift control lever and associated parts;

Figure 12 is a fragmentary sectional view taken on line 12—12 of Figure 8.

By referring to the drawings, it will be seen that 15 designates the main frame which carries a transverse axle 16. This axle 16 is supported by wheels 17. A draft yoke 18 is carried by the forward end of the frame 15 and this yoke 18 is supported by a pivot wheel 19. A suitable draft means 20 is secured to the yoke 18.

A fertilizer hopper supporting frame 21 is hung below the main frame 15, and the frame 21 supports a pair of fertilizer hoppers 32 near the forward portion of the frame 21. A crank shaft 23 extends transversely across the frame 15 at its forward end, and a crank shaft 24 extends transversely across the frame 15 near its rear end. The crank arms 25 of the shaft 24 are pivotally connected to the rear of the frame 21, as at 26. The crank arms 27 of the shaft 23 are connected to the forward end of the frame 21 by means of links 28, as shown in Figure 3. The frame 21 is provided with upwardly bent portions 29 near the rear thereof to avoid contact with the shaft 69 carried by the frame 46 when the frame 46 is raised. A link 30 is connected to the arms 25 and 27 upon each side of the machine.

Fertilizer distributers 31 are carried by the frame 21 near the front thereof and at each side, as shown. The distributers 31 each comprises a hopper 32 open at its upper end. An adjuster wheel 33 is carried within the lower end of the hopper 32 adjacent the bottom discharge spout 34. A regulator gate 35 is located at the junction of the hopper 32 with the spout 34 to control the discharge of fertilizer from the hopper 32. The spout 34 tapers toward its lower end, as at 36, the lower end 36 having upwardly tapering and laterally spaced inverted V-shaped discharge openings 37 at the bottom thereof.

The adjuster wheel 33 is driven by a shaft 38 carried transversely of the frame 21. The shaft is driven by means of a sprocket chain 39 which passes over a sprocket wheel 40 carried by the shaft 38 and a drive sprocket wheel 41 carried by the axle 16. An auxiliary sprocket wheel 42 is carried by the shaft 38 and an auxiliary sprocket wheel 43 is carried by the axle 16 to permit a change of drive ratio when desired by placing a chain over the wheel 42 and 43 in place of the wheels 40 and 41. A clutch 44 is carried by the axle 16 to connect and release the drive between the axle 16 and the shaft 38. A clutch operating lever 45 is carried by the frame 15 to facilitate the operation of the clutch 44 from the rear of the machine.

A pair of seeder drill supporting frames 46 are swung below the frame 21, one at each side as shown. The frames are preferably hinged, as at 47, at their forward ends and are suspended by chains 48 at their rear ends. These chains 48 pass over circular guides 49 carried by the frame 15 to space the chains from the shaft 24. A hand lever 50 is carried by the shaft 24 to facilitate rotation of the shaft to lift the frames 21 and 46. A quadrant 51 is pivoted upon the lever 50 and is adapted to engage the edge of the rear end of the frame 15, to hold the lever 50 in a set position. A spring 52 engages the pivoted quadrant 51 and holds the quadrant 51 releasably in engagement with the frame 15, as shown in Figure 2. A quadrant releasing rod 53 engages the quadrant 51 and is also secured to the hand grip 54 carried by the lever 50. The shaft 23 is connected to the lever 50 by means of the links 55 and 56. The forward end of the link 56 is connected to the upstanding arm 57 of the shaft 23, as shown in Figure 2. The wheels 17 are secured to the axle 16 by ratchets 58 to facilitate turning of the machine, as well as backing. The ratchets 58 are so arranged as to permit rotation of the axle 16 only when the machine is moving in a forward direction.

A seeder hopper 59 is carried by each frame 46 near its rear end and this hopper 59 is provided with a seeder wheel chamber 60 at its bottom from the lower end of which chamber extends a seeder shoe 61. A seeder wheel 62 is rotatably mounted in the chamber 60, and the wheel 62 is provided with an annular flange 63 having radial seed-receiving apertures 64 extending from the periphery and through the flange. Headed seed ejector pins 65 are slidably mounted in the apertures 64, the heads of the pins limiting the movement of the pins in one direction. A stationary circular plate 66 is supported inwardly of the annular flange 63 by a bracket 67. A roller 68 is carried within a notch 69 formed in the bottom edge of the plate 66 just above the shoe 61 and in a position to provide rolling contact with the inner ends of the pins 65 as they pass under the roller 68.

As the wheel 62 rotates the seed, one or more at a time will drop into the apertures 64 as the pins 65 drop inwardly toward the center of the wheel 62. As the wheel 62 continues to rotate, and the headed pins come into contact with the roller 68, the pins 65 will be forced outwardly toward the periphery of the wheel 62, and the seed will drop down through the shoe 61. The wheel 62 is carried by a shaft 70, which shaft is driven by a sprocket 71, from a chain 72ª which chain in turn is driven from a sprocket wheel carried by the shaft 38.

A cam shoe 66ª is carried by the plate 66 and is adapted to engage under the heads of the pins 65 as the pins 65 pass the shoe 66ª and pull these pins 65 inwardly in the manner shown in Figures 8 and 12, to provide seed pockets in the outer ends of the apertures 64. The positive inward pulling of the pins 65 by the shoe 66ª will prevent the pins from sticking in the apertures 64 which would prevent the entrance of seed into the outer ends of the apertures 64. A wiper gate 63ª is hinged above the upper end of the flange 63, as shown in Figure 8, to wipe the outer edge of the flange 63 as the wheel 62 rotates to direct the seed from the hopper 59 into the apertures 64.

A scraper 72 is supported in front of each frame 46 upon an extension 73. Each scraper is inclined inwardly toward the center of the machine and is adapted to level the ground in the path of the fertilizer and seeder as the machine moves forward. A set of furrow-forming discs 74, as shown, are carried by the forward end of each frame 46 in the rear of the scraper 72 and in front of the fertilizer distributer 31, to form a series of seed and fertilizer-receiving troughs or trenches in the soil. A trench-covering wheel 75 inclined from its outer edges toward the center for covering the seed and fertilizer after the seed and fertilizer have been deposited in the trenches. A tapering scraper plate 76 is carried by the rear end of each frame 46 for scraping the wheel 75.

From the foregoing description, it will be seen that a very simple and efficient machine has been provided for dropping single seeds in any given distance of rows or hills, depending upon the spacing of the seed-receiving apertures within the wheel 62 and the speed at which the wheel is driven. Furthermore the fertilizer may be spread in a desired amount in advance of depositing the seed in the furrows or ditches. Through the medium of the present device seed may be saved for the reason that the seed may be economically and evenly distributed. Considerable labor will be saved by eliminating blocking and thinning as is usual with many planters now in use. Furthermore, because of the manner in which the seed is deposited in the ground, the plant will have a better chance to thrive since the plant will not be disturbed after once starting to grow. The present device is adapted to plant sugar beet seeds or any other similar seed, such as corn, peas, beans, and the like, in any desired space or rows according to the size of the machine and the ratio of the drive wheels and gears. Additional rows may be provided by adding additional units should it be necessary. Only two units have been illustrated in the present instance. Because of the structure of the seeder wheel it will not be likely to clog or miss in view of the fact that a definite extracting element is provided for ejecting the seed into the seeder shoe. Furthermore should any part discontinue its function the operator would immediately observe this fact. Because of the arrangement of the fertilizer distributer or hopper illustrated and described, the fertilizer will be deposited to the side of the trench in which the seeds are deposited and then the seeds will be covered and some of the fertilizer will be underneath the seeds. The gate 35 may be operated to control the amount of fertilizer deposited. When it is desired to sow the seed deep, the lever 50 may be adjusted to regulate the position of the frames 46 with respect to the ground and by throwing the clutch 44 out, the operation of all moving parts will be discontinued with the exception of the operation of the wheels 17. The wheels 17 are free to operate at all times and are provided with a ratchet 58, as illustrated and described, to facilitate turning and backing, the ratchet being arranged to provide only a forward drive for the axle 16. The scrapers 72 which constitute patch cleaners do not dig into the soil but only level the soil. The purpose of these scrapers 72 is to give the seeder wheel a clear and even path into which to drop the seed. This will give a more uniform growth of the beets because the seeds are all planted at the same depth. If the ground were uneven this would not be possible, for one seed might then be planted deep and another shallow.

It should be understood that certain detail changes in the construction and combination of parts may be employed without departing from the spirit of the invention, so long as such changes fall within the scope of the appended claims.

Having described the invention, what we claim as new is:

1. A seed drill and fertilizer attachment comprising a main frame, supporting wheels for said frame, a fertilizer distributer supporting frame hung below said main frame, means for raising and lowering said second mentioned frame, means for actuating said distributer, means for controlling said last mentioned means, a seeder means located in the rear of said fertilizer distributer, a seeder means supporting frame hung below said distributer supporting frame, a scraper carried by the forward end of said last mentioned frame, trench-forming discs located between said scraper and fertilizer distributer, and a covering element located in the rear of said seeder means.

2. A seed drill and fertilizer attachment comprising a main frame, supporting wheels for said frame, a fertilizer distributer supporting frame hung below said main frame, means for raising and lowering said second mentioned frame, means for actuating said distributer, means for controlling said last mentioned means, a seeder means located in the rear of said fertilizer distributer, a seeder means supporting frame hung below said distributer supporting frame, a scraper carried by the forward end of said last mentioned frame, trench-forming discs located between said scraper and fertilizer distributer, a covering element located in the rear of said seeder means, a tapering scraper plate engaging said covering element, said covering element having a circumferential V-shaped channel in its periphery, and adjustable lifting and lowering means for said seeder means supporting frame.

3. A seed drill and fertilizer attachment comprising a main frame, supporting wheels for said frame, a fertilizer distributer supporting frame hung below said main frame, means for raising and lowering said second mentioned frame, means for actuating said distributer, means for controlling said last mentioned means, a seeder means located in the rear of said fertilizer distributer, a seeder means supporting frame hung below said distributer supporting frame, a scraper carried by the forward end of said last mentioned frame, trench-forming discs located between said scraper and fertilizer distributer, a covering element located in the rear of said seeder means, a tapering scraper plate engaging said covering element, said covering element having a circumferential V-shaped channel in its periphery, and a lifting and lowering lever mounted upon said main frame, a quadrant pivoted to said lever and engaging the edge of said main frame for holding the lever in a selected position, spring means for holding the quadrant in a frame-engaging position, and flexible means connecting the lever and said seeder means supporting frame.

4. A seed drill and fertilizer attachment comprising a main frame, supporting wheels for said frame, a fertilizer distributer supporting frame hung below said main frame, means for raising and lowering said second mentioned frame, means for actuating said distributer, means for controlling said last mentioned means, a seeder means located in the rear of said fertilizer distributer, a seeder means supporting frame hung below said distributer supporting frame, driving means for said seeder means, said seeder means being carried by said seeder means supporting frame, a scraper carried by the forward end of said last mentioned frame, trench-forming discs located between said scraper and fertilizer distributer, and a covering element located in the rear of said seeder means.

HENRY H. RADDE.
WILLIAM A. RADDE.